US010893555B1

(12) United States Patent
Han et al.

(10) Patent No.: US 10,893,555 B1
(45) Date of Patent: Jan. 12, 2021

(54) VEHICLES AND METHODS IDENTIFYING A SERVICE DEVICE IN COMMUNICATION WITH A VEHICLE

(71) Applicant: TOYOTA MOTOR ENGINEERING & MANUFACTURING NORTH AMERICA, INC., Plano, TX (US)

(72) Inventors: Kyungtae Han, Palo Alto, CA (US); Katsumi Nagata, Foster City, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/709,047

(22) Filed: Dec. 10, 2019

(51) Int. Cl.
  *H04W 76/11* (2018.01)
  *G06K 9/00* (2006.01)
  *H04W 76/14* (2018.01)
  *B60S 5/02* (2006.01)
  *G06Q 20/40* (2012.01)
  *B60L 53/00* (2019.01)
  *B60R 11/04* (2006.01)
  *B60S 1/00* (2006.01)

(52) U.S. Cl.
  CPC .............. *H04W 76/11* (2018.02); *B60S 5/02* (2013.01); *G06K 9/00791* (2013.01); *G06Q 20/4014* (2013.01); *H04W 76/14* (2018.02); *B60L 53/00* (2019.02); *B60R 11/04* (2013.01); *B60S 1/00* (2013.01)

(58) Field of Classification Search
  CPC ......... H04W 76/11; H04W 76/14; B60S 5/02; B60S 1/00; G06Q 20/4014; G06K 9/00791; B60R 11/04; B60L 53/00
  See application file for complete search history.

(56) References Cited

U.S. PATENT DOCUMENTS

| 9,881,432 | B2 | 1/2018 | Mcquade et al. |
| 2014/0357290 | A1 | 12/2014 | Grabner et al. |
| 2016/0094952 | A1 | 3/2016 | Mosher et al. |
| 2017/0193502 | A1 | 7/2017 | Mcquade et al. |

FOREIGN PATENT DOCUMENTS

KR  20170055739 A  5/2017
WO  2017096307 A1  6/2017

*Primary Examiner* — Lester G Kincaid
*Assistant Examiner* — Maryam Soltanzadeh
(74) *Attorney, Agent, or Firm* — Dinsmore & Shohl LLP

(57) ABSTRACT

Vehicles and methods are disclosed. A vehicle includes one or more imaging sensors, one or more processors, and one or more non-transitory memory modules storing machine-readable instructions. Executing the machine-readable instructions causes the one or more processors to receive identification information from a service device. Executing the machine-readable instructions causes the one or more processors to obtain, using the one or more imaging sensors, image data corresponding to identifying indicia of the service device. Executing the machine-readable instructions causes the one or more processors to authenticate the service device based on the identification information and the identifying indicia. Executing the machine-readable instructions causes the one or more processors to initiate a service in response to authentication of the service device.

4 Claims, 8 Drawing Sheets

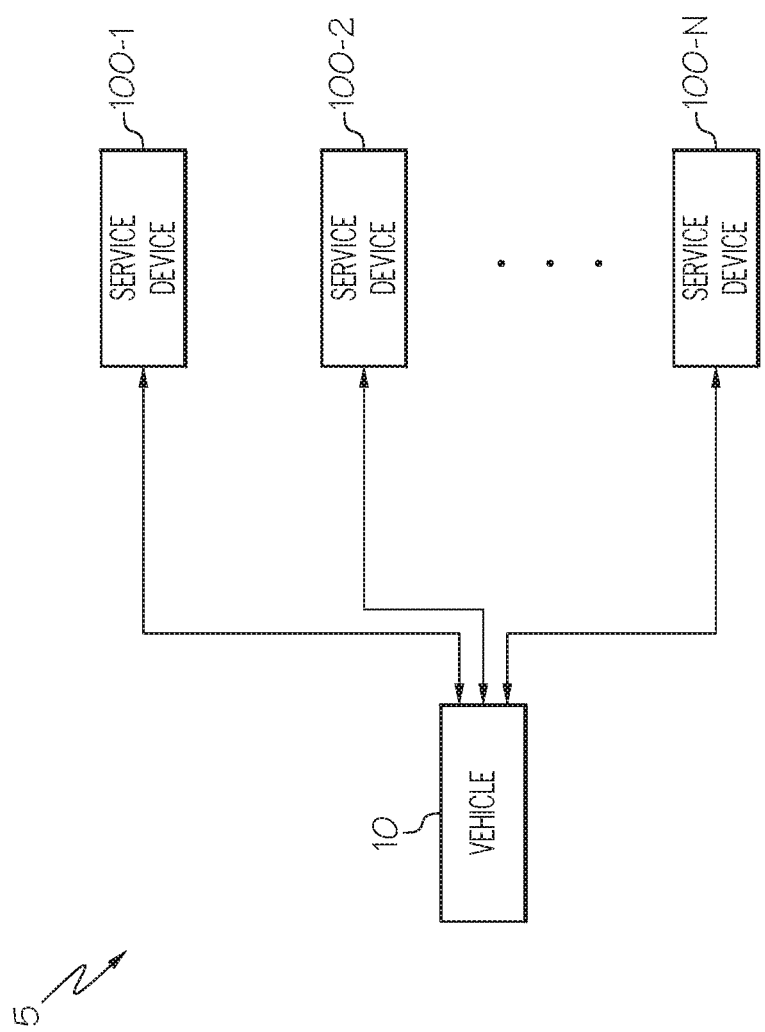

VEHICLES AND METHODS IDENTIFYING A SERVICE DEVICE IN COMMUNICATION WITH A VEHICLE

TECHNICAL FIELD

The present specification generally relates to devices, systems, and methods for identifying a service device in communication with a vehicle and, more particularly, to devices, systems, and methods for identifying a service device in communication with the vehicle using a Bluetooth communication protocol.

BACKGROUND

A service device, which may be one of a fuel pump, a parking meter, an electric vehicle charging kiosk, a fuel cell kiosk, a drive-thru kiosk, a parking space kiosk, a car wash kiosk, etc., may provide various services to a vehicle. As a non-limiting example, a vehicle and/or an operator thereof may interact with the service device to enable the vehicle to receive a corresponding target service.

A vehicle and a service device may communicate information associated with the target service using various wireless communication protocols. As a non-limiting example, a vehicle and a service device may communicate using a wireless beacon configured to transmit Bluetooth low energy (BLE) signals, which are Bluetooth signals that enable reduced power consumption and increased communication ranges compared to prior Bluetooth signal specifications. However, it may be difficult for the vehicle to identify and authenticate a service device when a plurality of service devices are located near the vehicle. As a non-limiting example, it may be difficult for the vehicle to identify and authenticate a parking meter when the parking meter is positioned between other vehicles and/or due to noise in a surrounding environment that may distort the BLE signal.

Accordingly, a need exists for a system that enables a vehicle to identify and authenticate a service device from a plurality of service devices.

SUMMARY

In one embodiment, a vehicle includes one or more imaging sensors, one or more processors, and one or more non-transitory memory modules storing machine-readable instructions. Executing the machine-readable instructions causes the one or more processors to receive identification information from a service device. Executing the machine-readable instructions causes the one or more processors to obtain, using the one or more imaging sensors, image data corresponding to identifying indicia of the service device. Executing the machine-readable instructions causes the one or more processors to authenticate the service device based on the identification information and the identifying indicia. Executing the machine-readable instructions causes the one or more processors to initiate a service in response to authentication of the service device.

In another embodiment, a method is disclosed and includes receiving, using one or more proximity sensors of a vehicle, identification information from a service device. The method includes obtaining, using one or more imaging sensors of the vehicle, image data corresponding to identifying indicia of the service device. The method includes authenticating, using one or more processors of the vehicle, the service device based on the identification information and the identifying indicia. The method includes initiating, using the one or more processors, a service in response to authentication of the service device.

In yet another embodiment, a method includes receiving, using one or more processors of a vehicle, a fuel pump timer value from each fuel pump device of a plurality of fuel pump devices. The method includes receiving, using the one or more processors, a fuel pump state from each fuel pump device of the plurality of fuel pump devices. The method includes receiving, using the one or more processors, a fuel flowing state from a fuel flow sensor of the vehicle. The method includes identifying, using the one or more processors, a first fuel pump device from the plurality of fuel pump devices based on the fuel pump timer value of each fuel pump device of the plurality of fuel pump devices, the fuel pump state of each fuel pump device of the plurality of fuel pump devices, and the fuel flowing state.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 1A schematically depicts system including a vehicle and a plurality of service devices according to one or more embodiments shown and described herein;

DETAILED DESCRIPTION

Figure 1B:
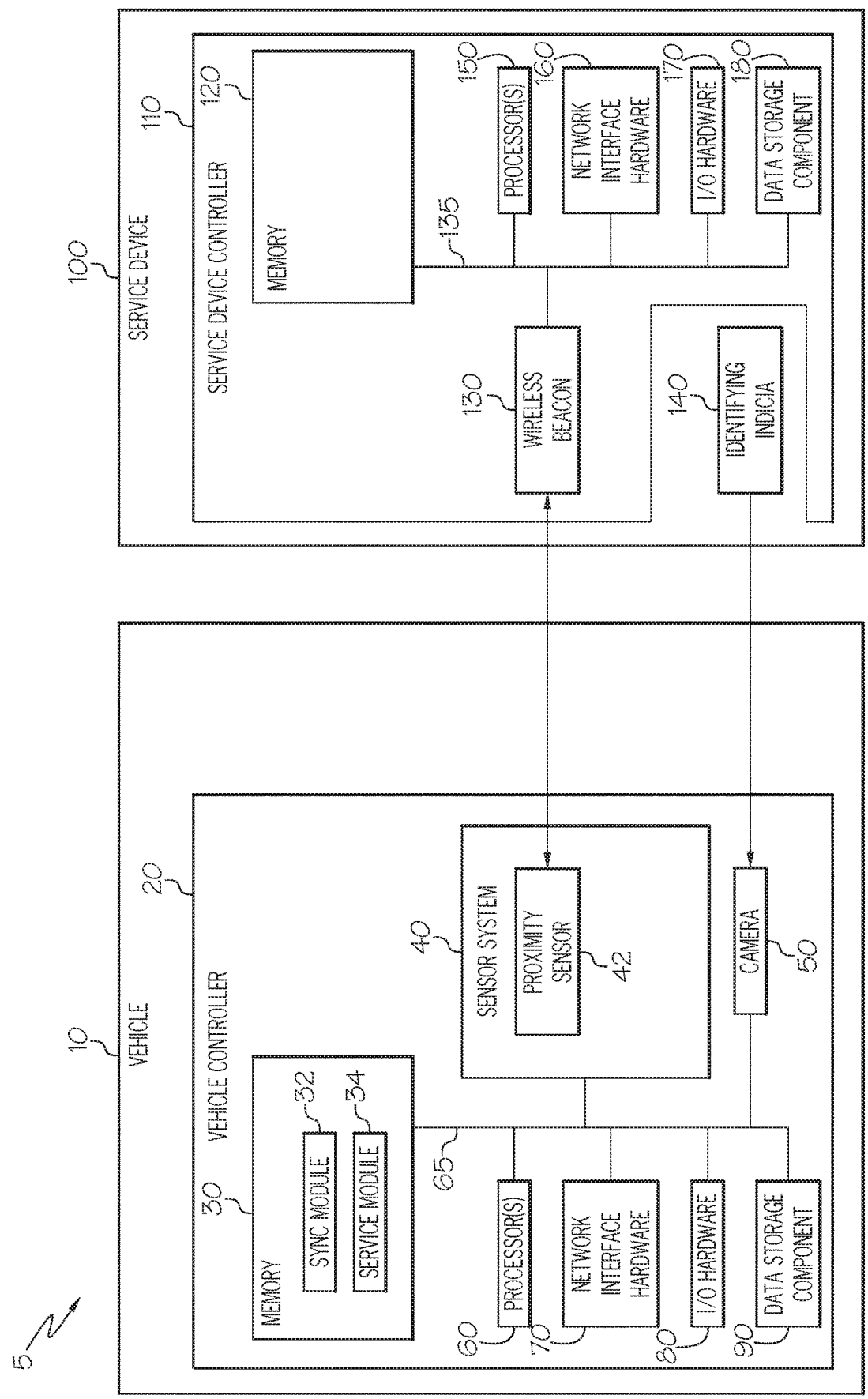
FIG. 1B schematically depicts a functional block diagram of a vehicle communicating with a service device according to one or more embodiments shown and described herein.

Referring generally to the figures, embodiments of the present disclosure are generally related to vehicles that include one or more imaging sensors. In some embodiments, a wireless beacon of the vehicle receives identification information from a wireless beacon of a service device. Furthermore, one or more imaging sensors of the vehicle may receive identification information from a service device. The vehicle may then authenticate the service device by verifying that the identification information matches the identifying indicia. In response to authentication of the service device, a target service associated with service device may be initiated. Accordingly, the vehicle can verify that it is receiving the correct target service and/or is receiving the target service from the correct service device. Furthermore, identifying and authenticating the service device may improve the vehicle's security while performing various post-identification and/or target service functions, such as processing a payment.

As used herein, the phrase "service device" refers to any device that is configured to provide a service to a vehicle. As non-limiting examples, the service device may be one of a fuel pump, a parking meter, an electric vehicle charging kiosk, a fuel cell kiosk, a drive-thru kiosk, a parking space kiosk, a car wash kiosk, and/or any other device that can provide a service to a vehicle.

As used herein, the term "RSSI" refers to a power ratio in decibels (dBm) of a signal received by one of a vehicle and a service device. In some embodiments, a relatively strong RSSI generally indicates that a service device is close to the vehicle, and a relatively weak RSSI generally indicates that a service device is further away from the vehicle. It should be understood that that other units may be utilized to represent the power of a signal received by one of a service device and a vehicle, such as a power spectral density of the message (dBm/MHz), a bit error rate (BER) of the message, a signal-to-noise ratio (SNR), a reference signal received quality (RSRQ), and/or the like.

As used herein, the phrase "BLE signal" refers to a Bluetooth low energy signal. While the embodiments of the present disclosure are provided in the context of a BLE signal, it should be understood that the embodiments described herein are applicable to other near field communication protocols, such as IrDA, Bluetooth®, Wireless USB, Z-Wave, ZigBee, ultra wide-band (UWB), and the like.

Referring now to FIG. 1, a system 5 is schematically depicted. In embodiments, the system 5 includes a vehicle 10, a first service device 100-1, a second service device 100-2, and an nth service device 100-n (referred to as the service device 100 when a generic one of the service devices is discussed, and collectively referred to as the plurality of service devices 100 when multiple service devices are discussed without specific reference to particular service devices). The plurality of service devices 100 are generally configured to provide various services to the vehicle 10, as described below in further detail. The vehicle 10 and the plurality of service devices 100 may communicate using various wireless communication protocols, such as a Bluetooth link, a Bluetooth low energy (BLE) link, a wireless fidelity (Wi-Fi) link, near field communication link, a cellular link, and/or the like.

With reference to FIG. 1B, a functional block diagram of the system 5 including the vehicle 10 and the service device 100 is schematically depicted. In some embodiments, the vehicle 10 includes a vehicle controller 20, which includes a memory module 30, a sensor system 40, a camera 50, one or more processors 60, a communication interface 65, network interface hardware 70, input/output hardware 80, and a data storage component 90. In various embodiments, the memory module 30 includes a sync module 32 and a service module 34, and the sensor system 40 includes a proximity sensor 42. In some embodiments, the service device 100 includes identifying indicia 140 and a service device controller 110. The service device controller 100 includes a memory module 120, a wireless beacon 130, a communication interface 135, one or more processors 150, network interface hardware 160, input/output hardware 170, and a data storage component 180.

In some embodiments, the sensor system 40 of the vehicle 10 is configured to extract identifying information of the protocol data unit (PDU) of the BLE signal transmitted by the service device 100. Furthermore, the sensor system 40 is configured to, using the proximity sensor 42, measure an RSSI of a BLE signal transmitted by the wireless beacon 130 and determine a distance between the vehicle 10 and the service device 100 based on the measured RSSI. As a non-limiting example, the sensor system 40 may determine the distance between the vehicle 10 and the service device 100 based on a signal propagation constant and a transmission power of the signal transmitted by the wireless beacon 130.

In some embodiments, the proximity sensor 42 is included within a BLE controller (not shown), which includes a physical layer and a link layer. In some embodiments, the physical layers of the BLE controllers include analog circuitry configured to transmit and receive BLE signals. As a non-limiting example, the physical layers include a radio circuit configured to communicate on the 2.4 GHz ISM band. Furthermore, thirty seven channels of the 2.4 GHz ISM band may be dedicated to bidirectional communication between the vehicle 10 and the service device 100 (e.g., channels 0-36 are dedicated for data communication), and three of the channels may be dedicated for device discovery (e.g., channels 37-39 are dedicated for the transmission/reception of BLE advertising signals). In some embodiments, the physical layers may include a Gaussian frequency-shift keying (GFSK) circuit for filtering and modulating the BLE signals prior to transmission. The various analog parameters and functions of the physical layers, such as adaptive frequency hopping, device discovery, connection establishment, and/or the like, may be controlled by the link layers of the BLE controllers.

The camera 50 is configured to obtain image data of the identifying indicia 140 of the service device 100. In some embodiments, the camera 50 may be a standard definition (e.g., 640 pixels×480 pixels) camera. In various embodiments, the camera 50 may be a high definition camera (e.g., 1440 pixels×1024 pixels or 1266 pixels×1024 pixels). In some embodiments, the camera 50 may have a resolution other than 640 pixels×480 pixels, 1440 pixels×1024 pixels, or 1266 pixels×1024 pixels. It should be understood that in other embodiments, the camera 50 may be replaced or supplemented with any imaging sensor and/or device that is configured to obtain image data. As a non-limiting example, the imaging sensor and/or device may include, but is not limited to, RGB-D sensors IR sensors, and/or the like. The imaging sensor and/or device may have any suitable resolution and may be configured to detect radiation in any desirable wavelength band, such as an ultraviolet wavelength band, a near-ultraviolet wavelength band, a visible light wavelength band, a near infrared wavelength band, an infrared wavelength band, and/or the like.

In some embodiments, each of the one or more processors 60 may be any device capable of executing machine readable and executable instructions. Accordingly, each of the one or more processors 60 may be a controller, an integrated circuit, a microchip, a computer, or any other processing device. The one or more processors 60 are coupled to the communication interface 65 that provides signal interconnectivity between various modules of the vehicle 10. Accordingly, the communication interface 65 may communicatively couple any number of processors 60 with one another, and allow the modules coupled to the communication interface 65 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication interface 65 may be formed from any medium that is capable of transmitting a signal such as, for example, conductive wires, conductive traces, optical waveguides, or the like. In one embodiment, the communication interface 65 comprises a combination of conductive traces, conductive wires, connectors, and buses that cooperate to permit the transmission of electrical data signals to components such as the one or more processors 60, the memory module 30, the sensor system 40, the camera 50, input devices, output devices, and communication devices. Accordingly, the communication interface 65 may comprise a vehicle bus, such as a LIN bus, a CAN bus, a VAN bus, and the like. In some embodiments, the communication interface 65 may facilitate the transmission of wireless signals, such as Wi-Fi, Bluetooth, Near Field Communication (NFC) and the like. Moreover, the communication interface 65 may be formed from a combination of mediums capable of transmitting signals. In one embodiment, the communication interface 65 comprises a combination of conductive traces, conductive wires, connectors, and buses that cooperate to permit the transmission of electrical data signals to components such as processors, memories, sensors, input devices, output devices, and communication devices. As used herein, the term "signal" refers to a waveform (e.g., electrical, optical, magnetic, mechanical or electromagnetic), such as DC, AC, sinusoidal-wave, triangular-wave, square-wave, vibration, and the like, capable of traveling through a medium.

The memory module 30 is coupled to the communication interface 65 and comprises a non-transitory computer-readable medium, such as RAM, ROM, flash memories, hard drives, or any device capable of storing machine readable and executable instructions such that the machine readable and executable instructions can be accessed by the one or more processors 60. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the memory module 30. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

A description of the sync module 32 and the service module 34 will now be provided. The sync module 32 receives input from the service device 100 and generates state information associated with the service device 100, as described below in further detail with reference to FIGS. 2-5. The service module 34 receives input from the sensor system 40 and the camera 50, authenticates the service device 100, and initiates a service associated with the service device 100, as described below in further detail.

Still referring to FIG. 1B, the network interface hardware 70 may include and/or communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The input/output hardware 80 may include a basic input/output system (BIOS) that interacts with hardware of the vehicle 10, device drivers that interact with particular devices of the vehicle 10, one or more operating systems, user applications, background services, background applications, etc. The data storage component 90 is communicatively coupled to the one or more processors 60. As a non-limiting example, the data storage component 90 may include one or more database servers that support NoSQL, MySQL, Oracle, SQL Server, NewSQL, or the like.

Referring now to the service device 100 shown in FIG. 1B, the wireless beacon 130 is configured to transmit a BLE signal to the vehicle 10. In some embodiments, the BLE signal transmitted by the wireless beacon 130 includes identifying information in the PDU. As described below in further detail, the identifying information may be utilized to authenticate the service device 100 and to initiate a target service. In some embodiments, the wireless beacon 130 is included within a BLE controller (not shown), which includes a physical layer and a link layer. In some embodiments, the physical layers of the BLE controller of the service device 100 includes analog circuitry configured to transmit and receive BLE signals. As a non-limiting example, the physical layers include a radio circuit configured to communicate on the 2.4 GHz ISM band. Furthermore, thirty seven channels of the 2.4 GHz ISM band may be dedicated to bidirectional communication between the vehicle 10 and the service device 100 (e.g., channels 0-36 are dedicated for data communication), and three of the channels may be dedicated for device discovery (e.g., channels 37-39 are dedicated for the transmission/reception of BLE advertising signals). In some embodiments, the physical layers may include a GFSK circuit for filtering and modulating the BLE signals prior to transmission. The various analog parameters and functions of the physical layers, such as adaptive frequency hopping, device discovery, connection establishment, and/or the like, may be controlled by the link layers of the BLE controllers.

The identifying indicia 140 may include text, characters, graphics, a bar code, protrusions/indentations, and/or any features that uniquely identify the service device 100 and that can be captured by the camera 50. As described below in further detail, the identifying indicia 140 obtained by the camera 50 may be utilized to authenticate the service device 100 and to initiate a target service.

In some embodiments, each of the one or more processors 150 may be any device capable of executing machine readable and executable instructions. Accordingly, each of the one or more processors 150 may be a controller, an integrated circuit, a microchip, a computer, or any other processing device. The one or more processors 150 are coupled to the communication interface 135 that provides signal interconnectivity between various modules of the service device 100. Accordingly, the communication interface 135 may communicatively couple any number of processors 150 with one another, and allow the modules coupled to the communication interface 135 to operate in a distributed computing environment. Specifically, each of the modules may operate as a node that may send and/or receive data.

Accordingly, the communication interface 135 may be formed from any medium that is capable of transmitting a signal such as, for example, conductive wires, conductive traces, optical waveguides, or the like. In some embodiments, the communication interface 135 may facilitate the transmission of wireless signals, such as Wi-Fi, Bluetooth®, NFC, and the like. Moreover, the communication interface 135 may be formed from a combination of mediums capable of transmitting signals. In one embodiment, the communication interface 135 comprises a combination of conductive traces, conductive wires, connectors, and buses that cooperate to permit the transmission of electrical data signals to components such as processors, memories, sensors, input devices, output devices, and communication devices.

The memory module 110 is coupled to the communication interface 135 and comprises a non-transitory computer-readable medium, such as RAM, ROM, flash memories, hard drives, or any device capable of storing machine readable and executable instructions such that the machine readable and executable instructions can be accessed by the one or more processors 150. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, OOP, scripting languages, microcode, etc., that may be compiled or assembled into machine readable and executable instructions and stored on the memory module 110. Alternatively, the machine readable and executable instructions may be written in an HDL, such as logic implemented via either an FPGA configuration or an ASIC, or their equivalents. Accordingly, the methods described herein may be implemented in any conventional computer programming language, as pre-programmed hardware elements, or as a combination of hardware and software components.

Still referring to FIG. 1B, the network interface hardware 160 may include and/or communicate with any wired or wireless networking hardware, including an antenna, a modem, a LAN port, a Wi-Fi card, a WiMAX card, an LTE card, a ZigBee card, a Bluetooth chip, a USB card, mobile communications hardware, and/or other hardware for communicating with other networks and/or devices. The input/output hardware 170 may include a BIOS that interacts with hardware of the service device 100, device drivers that interact with particular devices of the service device 100, one or more operating systems, user applications, background services, background applications, etc. The data storage component 180 is communicatively coupled to the one or more processors 150. As a non-limiting example, the data storage component 180 may include one or more database servers that support NoSQL, MySQL, Oracle, SQL Server, NewSQL, or the like.

Figure 1C:
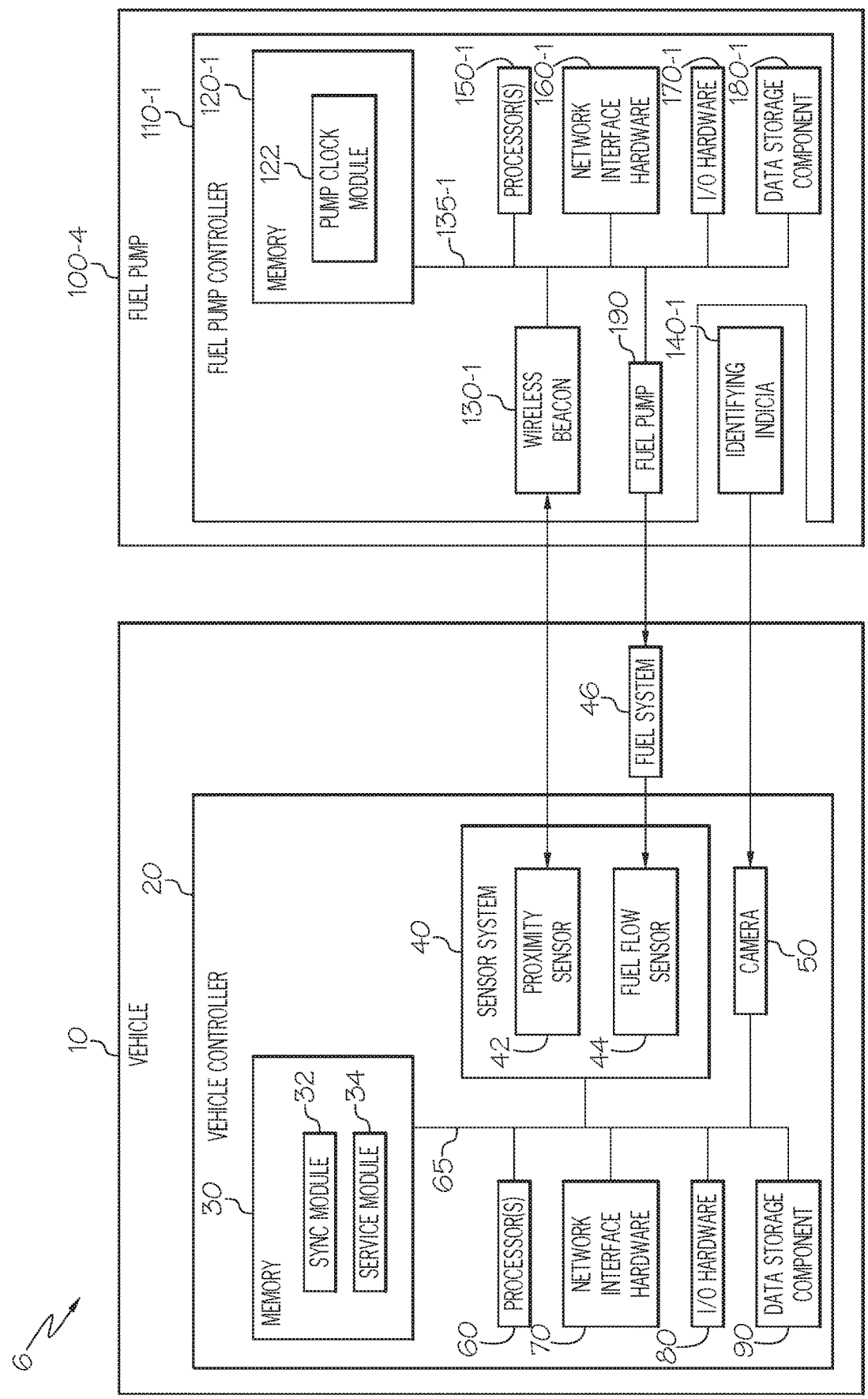
FIG. 1C schematically depicts a functional block diagram of a vehicle communicating with a fuel pump according to one or more embodiments shown and described herein.

With reference to FIG. 1C, a functional block diagram of a system 6 including the vehicle 10 and fuel pump 100-4 is schematically depicted. The vehicle 10 of system 6 is similar to the vehicle 10 illustrated in system 5 of FIG. 1B, as the vehicle 10 of system 6 includes the vehicle controller 20, which includes the memory module 30, the sensor system 40, the camera 50, the one or more processors 60, the communication interface 65, the network interface hardware 70, the input/output hardware 80, and the data storage component 90. Moreover, the memory module 30 of the vehicle 10 of system 6 includes the sync module 32 and the service module 34, and the sensor system 40 of the vehicle 10 of system 6 includes the proximity sensor 42, in addition to a fuel flow sensor 44, which will be described further below. The vehicle also includes a fuel system 46, as will be described below.

Likewise, the fuel pump 100-4 includes identifying indicia 140-1, which is similar to the identifying indicia 140 described in FIG. 1B, and a fuel pump controller 110-1, which is similar to the service device controller 110 described in FIG. 1B. Furthermore, the fuel pump controller 110-1 includes a memory module 120-1 (including a pump clock module 122) that is similar to the memory module 120 described in FIG. 1B, a wireless beacon 130-1 (which is similar to the wireless beacon 130 described in FIG. 1), one or more processors 150-1 (which is similar to the one or more processors 150 described in FIG. 1), network interface hardware 160-1 (which is similar to the network interface hardware 160 described in FIG. 1B), input/output hardware 170-1 (which is similar to the input/output hardware 170 described in FIG. 1), a data storage component 180-1 (which is similar to the data storage component 180 described in FIG. 1B), and a fuel pump 190.

As noted above, the sensor system 40 of the vehicle 10 includes a fuel flow sensor 44, and the vehicle 10 includes a fuel system 46. Furthermore, in system 6 illustrated in FIG. 1C, the memory module 120-1 includes a pump clock module 122, and the fuel pump controller 110-1 includes a fuel pump 190.

The fuel flow sensor 44 may be one of a flow meter, a flow control valve, or similar device that monitors and/or regulates fuel flow from the fuel pump 190 into the fuel system 46, which includes fuel lines and a fuel reservoir. The pump clock module 122 may be a timer configured to generate a value indicating an amount of time the fuel pump 100-4 is in a dispensing state, as described below in further detail with reference to FIG. 4.

Figure 1D:
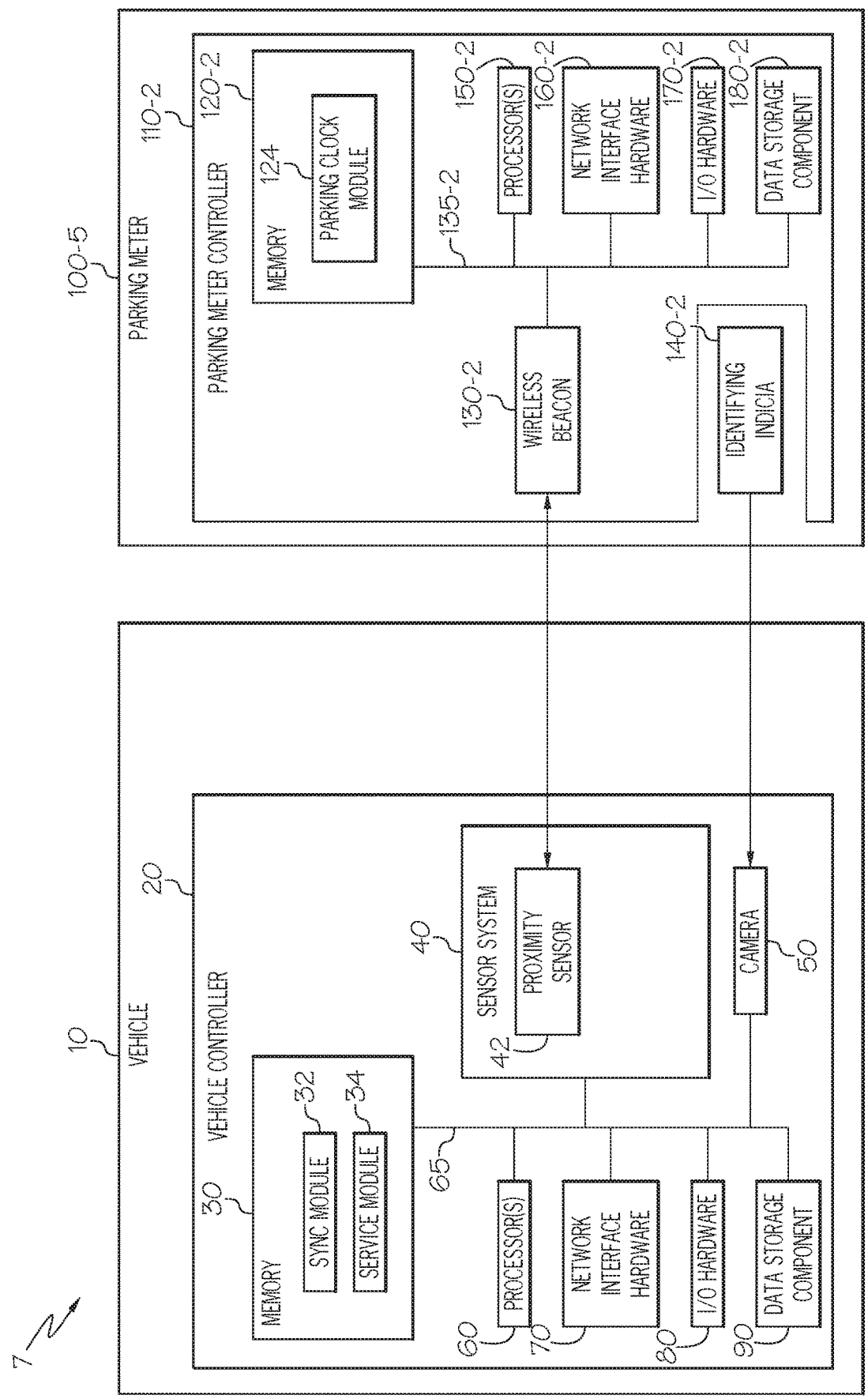
FIG. 1D schematically depicts a functional block diagram of a vehicle communicating with a parking meter according to one or more embodiments shown and described herein.

With reference to FIG. 1D, a functional block diagram of a system 7 including the vehicle 10 and parking meter 100-5 is schematically depicted. The vehicle 10 of system 7 is similar to the vehicle 10 illustrated in system 5 of FIG. 1B, as the vehicle 10 of system 7 includes the vehicle controller 20, which includes the memory module 30, the sensor system 40, the camera 50, the one or more processors 60, the communication interface 65, the network interface hardware 70, the input/output hardware 80, and the data storage component 90. Moreover, the memory module 30 of the vehicle 10 of system 7 includes the sync module 32 and the service module 34, and the sensor system 40 of the vehicle 10 of system 7 includes the proximity sensor 42.

Still referring to FIG. 1D, the parking meter 100-5 includes identifying indicia 140-2, which is similar to the identifying indicia 140 described in FIG. 1B, and a parking meter controller 110-2, which is similar to the service controller 110 described in FIG. 1B. Furthermore, the parking meter controller 110-2 includes a memory module 120-2 (including a parking clock module 124 as will be described below) similar to the memory module 120 described in FIG. 1B, a wireless beacon 130-2 (which is similar to the wireless beacon 130 described in FIG. 1i), one or more processors 150-2 (which is similar to the one or more processors 150 described in FIG. 1), network interface hardware 160-2 (which is similar to the network interface hardware 160 described in FIG. 1B), input/output hardware 170-2 (which is similar to the input/output hardware 170 described in FIG. 1B), and a data storage component 180-2 (which is similar to the data storage component 180 described in FIG. 1).

As noted above, in system 7 illustrated in FIG. 1D, the memory module 120-2 includes a parking clock module 124, which may be a timer configured to generate a value indicating an amount of time the parking meter 100-5 is providing a parking service, as described below in further detail.

Figure 2:
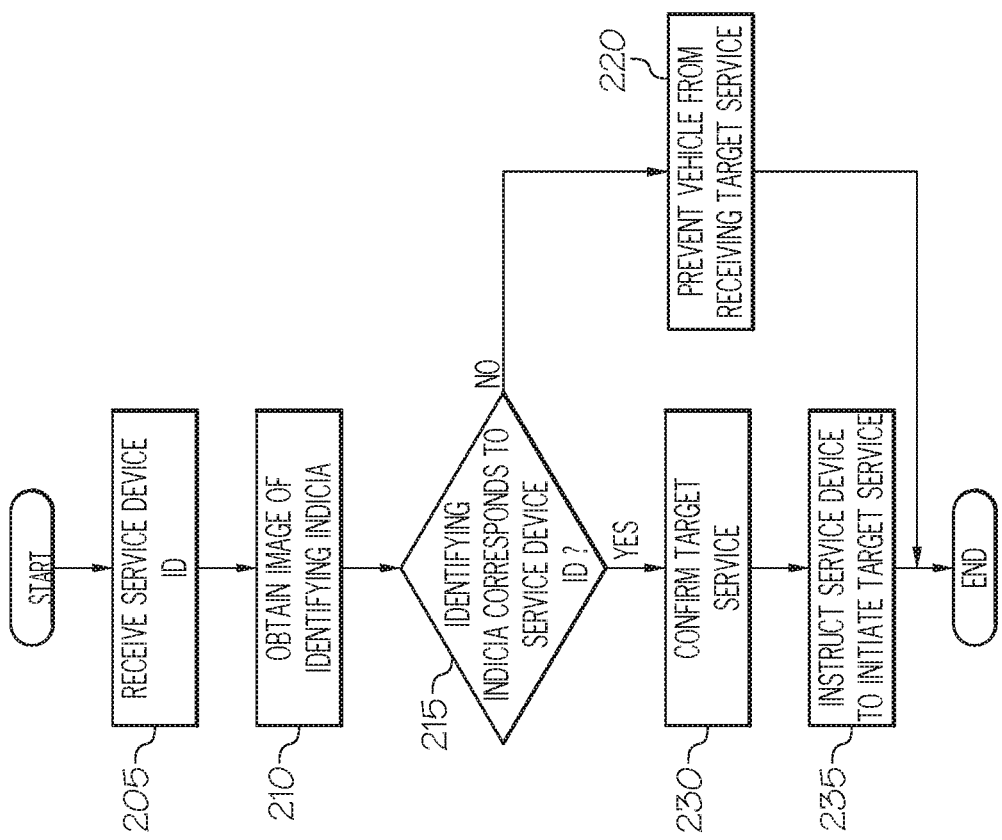
FIG. 2 depicts a flow diagram for initiating a target service according to one or more embodiments shown and described herein.

With reference to FIG. 2, a flow diagram illustrating an example method for initiating a target service from the service device 100 is schematically depicted. The flow diagram elements described herein may be translated into machine-readable instructions. While the steps shown in FIG. 2 are shown as all occurring and in a particular order, in other embodiments one or more of the steps may not be performed, and in some embodiments, one or more of the steps may be performed in a different order as shown and described herein.

Referring to FIG. 2 in conjunction with FIGS. 1A-1D, at step 205, the proximity sensor 42 of the vehicle 10 receives a service device identification value from the service device 100. As a non-limiting example, the proximity sensor 42 may receive the service device identification value by extracting identifying information from the PDU (e.g., a unique numeric identifier (UUID) of the BLE signal, a MAC address, etc.) of the BLE signal transmitted by the service device 100.

Still referring to FIG. 2 in conjunction with FIGS. 1A-1D, at step 210, an imaging sensor of the vehicle 10 (e.g., the camera 50) obtains an image of the identifying indicia 140 of the service device 100. As described above, the identifying indicia 140 may include text, characters, graphics, a bar code, protrusions/indentations, and/or any features that uniquely identify the service device 100. As a non-limiting example, the identifying indicia 140 may be a series of characters that uniquely identifies the service device 100.

Still referring to FIG. 2 in conjunction with FIGS. 1A-1D, at step 215, the service module 34 performs an authentication function by determining whether the identifying indicia 140 corresponds to the service device identification value. As a non-limiting example, the service module 34 may identify a corresponding service device 100 based on the service device identification value and as indicated by one or more entries in the data storage component 90. Furthermore, the service module 34 may perform various image processing algorithms to identify a corresponding service device 100 based on the image of the identifying indicia 140 and as indicated by one or more entries in the data storage component 90. Accordingly, if the service module 34 determines that the service device identification value and the identifying indicia match (e.g., by determining that the one or more entries retrieved from the data storage component 90 are associated with the same service device 100) (YES at step 215), the service module 34 authenticates the service device 100, and the method proceeds to step 230. If the service module 34 determines that the service device identification value and the identifying indicia do not match (e.g., by determining that the one or more entries retrieved from the data storage component 90 are not associated with the same service device 100) (NO at step 215), the service module 34 does not authenticate the service device 100, and the method proceeds to step 220.

Still referring to FIG. 2 in conjunction with FIGS. 1A-1D, at step 220, the service module 34 prevents the vehicle 10 from receiving the target service. Still referring to FIG. 2 in conjunction with FIGS. 1A-1D, at step 230, the service module 34 confirms the target service (e.g., confirms that the vehicle 10 will receive fuel). Still referring to FIG. 2 in conjunction with FIGS. 1A-1D, at step 235, the service module 34 instructs the service device 100 to initiate the target service and then ends.

Figure 3:
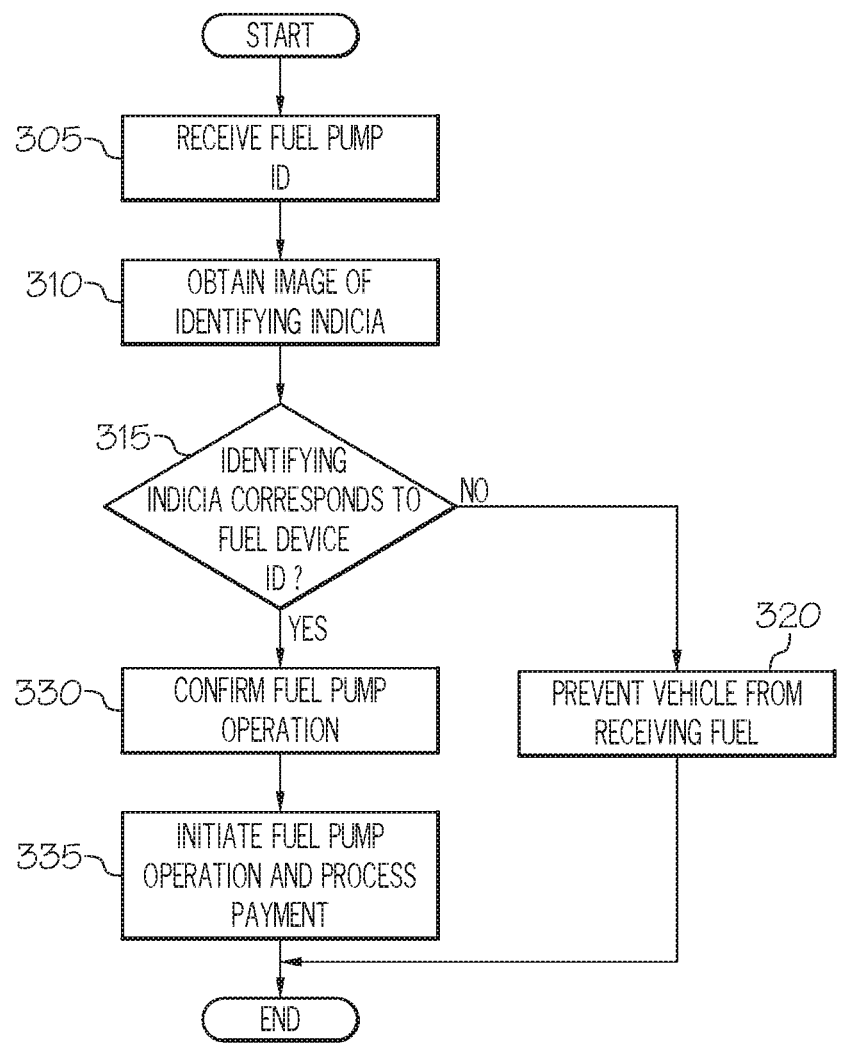
FIG. 3 depicts a flow diagram for initiating a fuel pump service according to one or more embodiments shown and described herein.

With reference to FIG. 3 in conjunction with FIG. 1C, a flow diagram illustrating an example method for initiating a target service from the fuel pump 100-4 is schematically depicted. The flow diagram elements described herein may be translated into machine-readable instructions. While the steps shown in FIG. 3 are shown as all occurring and in a particular order, in other embodiments one or more of the steps may not be performed, and in some embodiments, one or more of the steps may be performed in a different order as shown and described herein.

Referring to FIG. 3 in conjunction with FIG. 1C, at step 305, the proximity sensor 42 of the vehicle 10 receives a service device identification value from the fuel pump 100-4. As a non-limiting example, the proximity sensor 42 may receive the service device identification value by extracting identifying information from the PDU (e.g., a unique numeric identifier (UUID) of the BLE signal, a MAC address, etc.) of the BLE signal transmitted by the fuel pump 100-4.

Still referring to FIG. 3 in conjunction with FIG. 1C, at step 310, an imaging sensor of the vehicle 10 (e.g., the camera 50) obtains an image of the identifying indicia 140-1 of the fuel pump 100-4. As described above, the identifying indicia 140-1 may include text, characters, graphics, a bar code, protrusions/indentations, and/or any features that uniquely identify the fuel pump 100-4. As a non-limiting example, the identifying indicia 140-1 may be a barcode that uniquely identifies the fuel pump 100-4.

Still referring to FIG. 3 in conjunction with FIG. 1C, at step 315, the service module 34 performs an authentication function by determining whether the identifying indicia 140-1 corresponds to the service device identification value. As a non-limiting example, the service module 34 may identify a corresponding fuel pump 100-4 based on the service device identification value and as indicated by one or more entries in the data storage component 90. Furthermore, the service module 34 may perform various image processing algorithms to identify a corresponding fuel pump 100-4 based on the image of the identifying indicia 140-1 and as indicated by one or more entries in the data storage component 90. Accordingly, if the service module 34 determines that the service device identification value and the identifying indicia match (e.g., by determining that the one or more entries retrieved from the data storage component 90 are associated with the same fuel pump 100-4) (YES at step 315), the service module 34 authenticates the fuel pump 100-4, and the method proceeds to step 330. If the service module 34 determines that the service device identification value and the identifying indicia do not match (e.g., by determining that the one or more entries retrieved from the data storage component 90 are not associated with the same fuel pump 100-4) (NO at step 315), the service module 34 does not authenticate the fuel pump 100-4, and the method proceeds to step 320.

Still referring to FIG. 3 in conjunction with FIG. 1C, at step 320, the service module 34 prevents the vehicle 10 from receiving fuel from the fuel pump 100-4. Still referring to FIG. 3 in conjunction with FIG. 1C, at step 330, the service module 34 confirms the fuel pumping operation (e.g., confirms that the vehicle 10 will receive fuel). Still referring to FIG. 3 in conjunction with FIG. 1C, at step 335, the service module 34 initiates the fuel pumping operation and processes a payment associated with a user of the vehicle 10. As a non-limiting example, payment information and/or systems associated with a user of the vehicle 10 may be included within the vehicle 10 or may be obtained with a mobile device (not shown) in communication with at least one of the vehicle 10 and/or the fuel pump 100-4.

Figure 4:
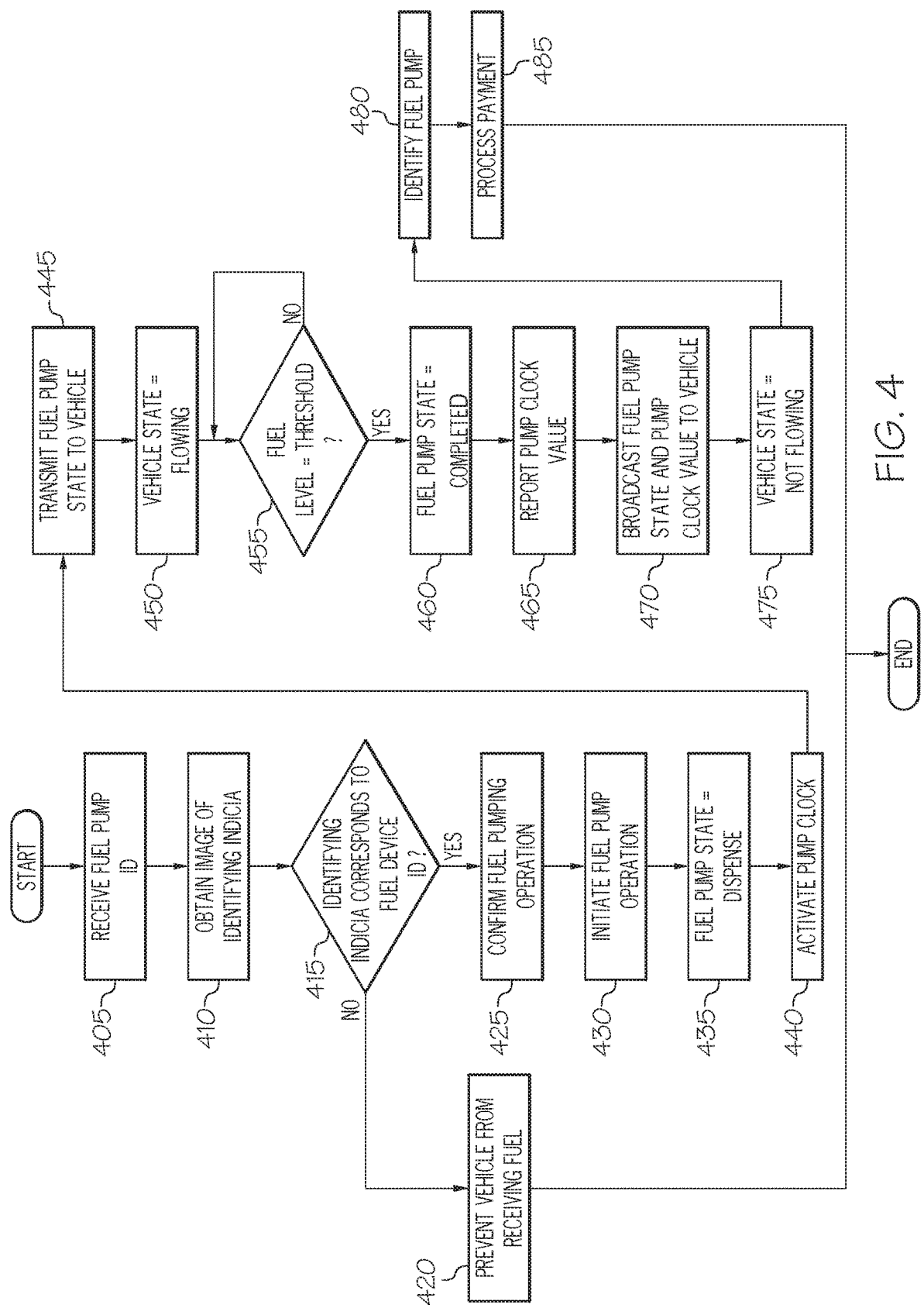
FIG. 4 depicts another flow diagram for initiating a fuel pump service according to one or more embodiments shown and described herein.

With reference to FIG. 4 and in conjunction with FIG. 1C, another flow diagram illustrating an example method for initiating a target service from the fuel pump 100-4 is schematically depicted. The flow diagram elements described herein may be translated into machine-readable instructions. While the steps shown in FIG. 4 are shown as all occurring and in a particular order, in other embodiments one or more of the steps may not be performed, and in some embodiments, one or more of the steps may be performed in a different order as shown and described herein.

Referring to FIG. 4 in conjunction with FIG. 1C, at step 405, the proximity sensor 42 of the vehicle 10 receives a service device identification value from the fuel pump 100-4. As a non-limiting example, the proximity sensor 42 may receive the service device identification value by extracting identifying information from the PDU (e.g., a unique numeric identifier (UUID) of the BLE signal, a MAC address, etc.) of the BLE signal transmitted by the fuel pump 100-4.

Still referring to FIG. 4 in conjunction with FIG. 1C, at step 410, an imaging sensor of the vehicle 10 (e.g., the camera 50) obtains an image of the identifying indicia 140-1 of the fuel pump 100-4. As described above, the identifying indicia 140-1 may include text, characters, graphics, a bar code, protrusions/indentations, and/or any features that uniquely identify the fuel pump 100-4. As a non-limiting example, the identifying indicia 140 may be a barcode that uniquely identifies the fuel pump 100-4.

Still referring to FIG. 4 in conjunction with FIG. 1C, at step 415, the service module 34 performs an authentication function by determining whether the identifying indicia 140 corresponds to the service device identification value. As a non-limiting example, the service module 34 may identify a corresponding fuel pump 100-4 based on the service device identification value and as indicated by one or more entries in the data storage component 90. Furthermore, the service module 34 may perform various image processing algorithms to identify a corresponding fuel pump 100-4 based on the image of the identifying indicia 140 and as indicated by one or more entries in the data storage component 90. Accordingly, if the service module 34 determines that the service device identification value and the identifying indicia match (e.g., by determining that the one or more entries retrieved from the data storage component 90 are associated with the same fuel pump 100-4) (YES at step 415), the service module 34 authenticates the fuel pump 100-4, and the method proceeds to step 425. If the service module 34 determines that the service device identification value and the identifying indicia do not match (e.g., by determining that the one or more entries retrieved from the data storage component 90 are not associated with the same fuel pump 100-4) (NO at step 415), the service module 34 does not authenticate the fuel pump 100-4, and the method proceeds to step 420.

Still referring to FIG. 4 in conjunction with FIG. 1C, at step 420, the service module 34 prevents the vehicle 10 from receiving fuel from the fuel pump 100-4. Still referring to FIG. 4 in conjunction with FIG. 1C, at step 425, the service module 34 confirms the fuel pumping operation (e.g., confirms that the vehicle 10 will receive fuel). Still referring to FIG. 4 in conjunction with FIG. 1C, at step 430, the service module 34 initiates the fuel pumping operation.

Still referring to FIG. 4 in conjunction with FIG. 1C, at step 435, the fuel pump controller 110-2 sets the fuel pump 100-4 to a dispensing state (e.g., the fuel pump 100-4 is providing, using the fuel pump 190, fuel to the fuel system 46 of the vehicle 10). Still referring to FIG. 4 in conjunction with FIG. 1C, at step 440, the pump clock module 122 of the fuel pump 100-4 is activated. Still referring to FIG. 4 in conjunction with FIG. 1C, at step 445, the fuel controller 110-2 transmits, using the wireless beacon 130-2, the fuel pump state (the dispensing state) to the vehicle 10.

Still referring to FIG. 4 in conjunction with FIG. 1C, at step 450, the sync module 32 sets the vehicle 10 to a flowing state (e.g., the fuel system 46 is receiving fuel from the fuel pump 100-4) in response to receiving the fuel pump state from the fuel pump 100-4. Still referring to FIG. 4 in conjunction with FIG. 1C, at step 455, the vehicle controller 20 determines whether the fuel level of the vehicle 10 is greater than a threshold fuel level (e.g., a fuel reservoir of the fuel system 46 is full) based on data obtained from the fuel flow sensor 44. If the fuel level is greater than the threshold fuel level, the method proceeds to step 460. If the fuel level is less than the threshold fuel level, the method remains at step 455 until the fuel level is greater than the threshold fuel level.

Still referring to FIG. 4 in conjunction with FIG. 1C, at step 465, the fuel pump controller 110-2 sets the fuel pump 100-4 to a completed state (e.g., the fuel pump 100-4 has provided sufficient fuel to the fuel system 46 of the vehicle 10). Still referring to FIG. 4 in conjunction with FIG. 1C, at step 470, the fuel controller 110-2 broadcasts, using the wireless beacon 130-2, the fuel pump state (the completed state) and the value of the pump clock module 122 to the vehicle 10. Still referring to FIG. 4 in conjunction with FIG. 1C, at step 475, the sync module 32 sets the vehicle 10 to a non-flowing state (e.g., the fuel system 46 is not receiving fuel from the fuel pump 100-4) in response to receiving the fuel pump state from the fuel pump 100-4. Still referring to FIG. 4 in conjunction with FIG. 1C, at step 480, the sync module 32 sets the vehicle 10 to a flowing state (e.g., the fuel system 46 is receiving fuel from the fuel pump 100-4) in response to receiving the fuel pump state from the fuel pump 100-4.

Still referring to FIG. 4 in conjunction with FIG. 1C, at step 485, the service module 34 processes a payment associated with a user of the vehicle 10. Prior to processing the payment, the sync module 32 updates the vehicle state and identifies the fuel pump 100-4 from a plurality of fuel pumps in order to correctly process the payment. In some embodiments, the sync module 32 may receive a fuel pump timer value generated by the pump clock module 122 of each fuel pump of the plurality of fuel pumps and a fuel pump state from each fuel pump of the plurality of fuel pumps. Furthermore, the sync module 32 may receive an indication of whether the vehicle 10 is in the flowing state or the non-flowing state based on data obtained from the fuel flow sensor 44. Accordingly, the sync module 32 may identify the fuel pump 100-4 based on the fuel pump timer values, a transition of the fuel pump states, and a state transition of the vehicle 10. As a non-limiting example, the sync module 32 may identify the fuel pump 100-4 from the plurality of fuel pumps if the fuel flow sensor 44 data indicates that a fueling operation was initiated at a first time, the fuel pump state of the fuel pump 100-4 transitions to a dispensing state at the first time, and the pump clock module 122 was activated at the first time. As another non-limiting example, the sync module 32 may identify the fuel pump 100-4 from the plurality of fuel pumps if the fuel flow sensor 44 data indicates that a fueling operation was stopped or completed at a second time, the fuel pump state of the fuel pump 100-4 transitions to a completed state at the second time, and the pump clock module 122 was deactivated at the second time.

Once the fuel pump 100-4 is identified from the plurality of fuel pumps, the service module 34 processes a payment associated with a user of the vehicle 10. As a non-limiting example, payment information and/or systems associated with a user of the vehicle 10 may be included within the vehicle 10 or may be obtained with a mobile device (not shown) in communication with at least one of the vehicle 10 and/or the fuel pump 100-4.

Figure 5:
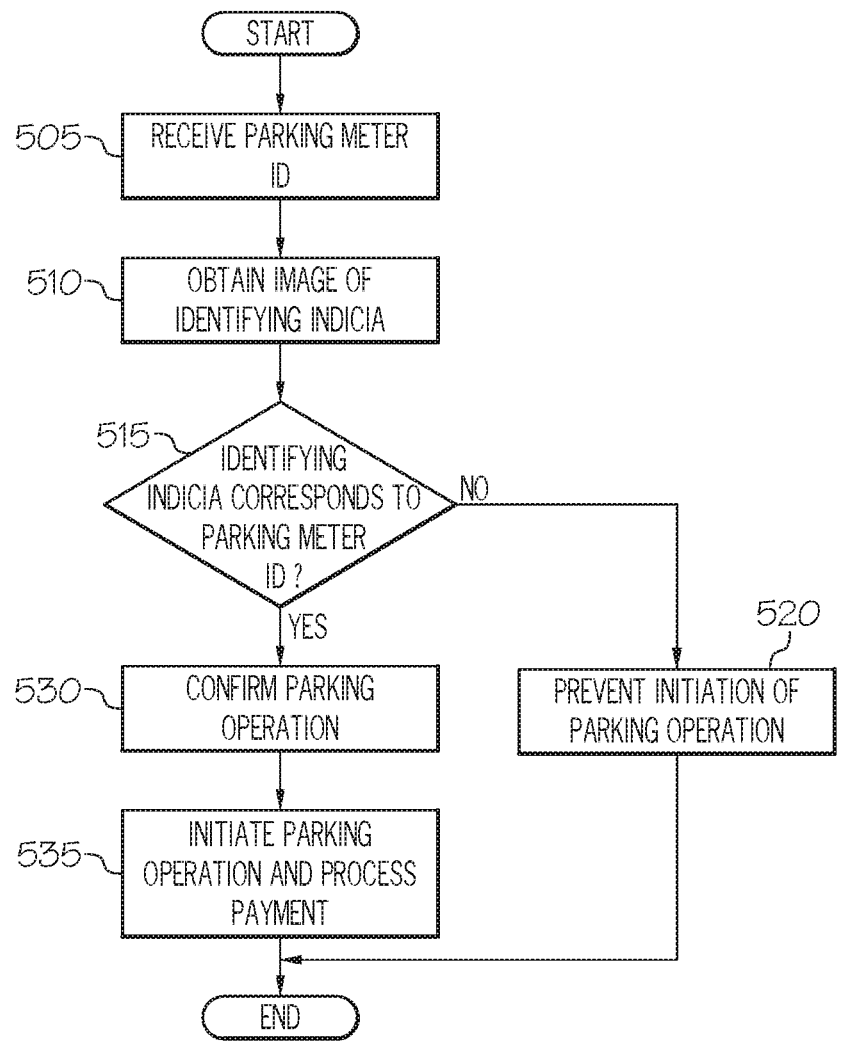
FIG. 5 depicts a flow diagram for initiating a fuel pump service according to one or more embodiments shown and described herein.

With reference to FIG. 5, a flow diagram illustrating an example method for initiating a target service from the parking meter 100-5 is schematically depicted. The flow diagram elements described herein may be translated into machine-readable instructions. While the steps shown in FIG. 5 are shown as all occurring and in a particular order, in other embodiments one or more of the steps may not be performed, and in some embodiments, one or more of the steps may be performed in a different order as shown and described herein.

Referring to FIG. 5 in conjunction with FIG. 1D, at step 505, the proximity sensor 42 of the vehicle 10 receives a service device identification value from the parking meter 100-5. As a non-limiting example, the proximity sensor 42 may receive the service device identification value by extracting identifying information from the PDU (e.g., a unique numeric identifier (UUID) of the BLE signal, a MAC address, etc.) of the BLE signal transmitted by the parking meter 100-5.

Still referring to FIG. 5 in conjunction with FIG. 1D, at step 510, an imaging sensor of the vehicle 10 (e.g., the camera 50) obtains an image of the identifying indicia 140-2 of the parking meter 100-5. As described above, the identifying indicia 140-2 may include text, characters, graphics, a bar code, protrusions/indentations, and/or any features that uniquely identify the parking meter 100-5. As a non-limiting example, the identifying indicia 140 may be a series of text that uniquely identifies the parking meter 100-5.

Still referring to FIG. 5 in conjunction with FIG. 1D, at step 515, the service module 34 performs an authentication function by determining whether the identifying indicia 140 corresponds to the service device identification value. As a non-limiting example, the service module 34 may identify a corresponding parking meter 100-5 based on the service device identification value and as indicated by one or more entries in the data storage component 90. Furthermore, the service module 34 may perform various image processing algorithms to identify a corresponding parking meter 100-5 based on the image of the identifying indicia 140 and as indicated by one or more entries in the data storage component 90. Accordingly, if the service module 34 determines that the service device identification value and the identifying indicia match (e.g., by determining that the one or more entries retrieved from the data storage component 90 are associated with the same parking meter 100-5) (YES at step 515), the service module 34 authenticates the parking meter 100-5, and the method proceeds to step 530. If the service module 34 determines that the service device identification value and the identifying indicia do not match (e.g., by determining that the one or more entries retrieved from the data storage component 90 are not associated with the same parking meter 100-5) (NO at step 515), the service module 34 does not authenticate the parking meter 100-5, and the method proceeds to step 520.

Still referring to FIG. 5 in conjunction with FIG. 1D, at step 520, the service module 34 prevents the vehicle 10 from parking in a parking spot associated with the parking meter 100-5. Still referring to FIG. 5 in conjunction with FIG. 1D, at step 530, the service module 34 confirms the parking operation (e.g., confirms that the vehicle 10 will park in a parking space associated with the parking meter 100-5 for a predefined period of time). Still referring to FIG. 5 in conjunction with FIG. 1D, at step 535, the service module 34 initiates the parking operation and processes a payment associated with a user of the vehicle 10. As a non-limiting example, payment information and/or systems associated with a user of the vehicle 10 may be included within the vehicle 10 or may be obtained with a mobile device (not shown) in communication with at least one of the vehicle 10 and/or the parking meter 100-5. In some embodiments, the parking meter 100-5 may activate the parking clock module 124 in response to initiating the parking operation.

It should now be understood that embodiments of the present disclosure are directed to a vehicle including a wireless beacon and one or more imaging sensors. The wireless beacon of a vehicle receives identification information from a wireless beacon of a service device, and the one or more imaging sensors receive identification information from the service device. The vehicle may then authenticate the service device by verifying that the identification information matches the identifying indicia. In response to authentication of the service device, a target service associated with service device may be initiated. Accordingly, the vehicle can verify that it is receiving the correct target service and/or is receiving the target service from the correct service device. Furthermore, identifying and authenticating the service device may improve the vehicle's security while performing various post-identification and/or target service functions, such as processing a payment.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method comprising:
   receiving, using one or more processors of a vehicle, a fuel pump timer value from each fuel pump device of a plurality of fuel pump devices;
   receiving, using the one or more processors, a fuel pump state from each fuel pump device of the plurality of fuel pump devices;
   receiving, using the one or more processors, a fuel flowing state from a fuel flow sensor of the vehicle; and
   identifying, using the one or more processors, a first fuel pump device from the plurality of fuel pump devices based on the fuel pump timer value of each fuel pump device of the plurality of fuel pump devices, the fuel pump state of each fuel pump device of the plurality of fuel pump devices, and the fuel flowing state.

2. The method of claim 1, wherein identifying the first fuel pump device from the plurality of fuel pump devices further comprises determining, using the one or more processors, that a state transition of the fuel pump timer value of the first fuel pump device, a state transition of the fuel pump state of the first fuel pump device, and a state transition of the fuel flowing state of the first fuel pump device correspond to each other.

3. The method of claim 2, wherein identifying the first fuel pump device from the plurality of fuel pump devices further comprises:
- determining, using the one or more processors, the fuel pump timer value of the first fuel pump device is initiated;
- determining, using the one or more processors, the fuel pump state of the first fuel pump device indicates that a fueling operation is initiated; and
- determining, using the one or more processors, the fuel flowing state indicates that the fueling operation is initiated.

4. The method of claim 2, wherein identifying the first fuel pump device from the plurality of fuel pump devices further comprises:
- determining, using the one or more processors, the fuel pump timer value of the first fuel pump device is completed;
- determining, using the one or more processors, the fuel pump state of the first fuel pump device indicates that a fueling operation is completed; and
- determining, using the one or more processors, the fuel flowing state indicates that the fueling operation is completed.

* * * * *